United States Patent [19]
Carey et al.

[11] 3,950,782
[45] Apr. 13, 1976

[54] DATA STORAGE AND RETRIEVAL SYSTEMS FOR USE WITH PLURAL TRACK STORAGE MEDIUM

[75] Inventors: Peter Majendie Carey, Beaconsfield; Norman Christopher John Tate, Montreal, both of Canada

[73] Assignee: Lektromedia Ltd., Pointe Claire, Canada

[22] Filed: Aug. 6, 1973

[21] Appl. No.: 385,805

[52] U.S. Cl. ............................................. 360/72
[51] Int. Cl.² ...................................... G11B 15/18
[58] Field of Search ........................ 360/48, 49, 72

[56] References Cited
UNITED STATES PATENTS

| | | | |
|---|---|---|---|
| 2,932,010 | 4/1960 | Mayer et al. | 360/48 |
| 3,399,394 | 8/1968 | Smith | 360/48 |
| 3,631,421 | 12/1971 | Perkins | 360/48 |
| 3,686,650 | 8/1972 | Gleim et al. | 360/49 |
| 3,714,382 | 1/1973 | Sykes | 360/72 |
| 3,792,442 | 2/1974 | Koeijmans | 360/49 |

*Primary Examiner*—Vincent P. Canney
*Attorney, Agent, or Firm*—Robert J. Schaap

[57] ABSTRACT

A system for storage and retrieval of information including address messages and data messages on a multi-track magnetic tape. The data messages are preferably present in the form of audio information. The address messages are derived from a series of location derivation codes which are generated through pulse counts from the spool of a tape transport to verify the location of a message on the tape. These location derivation codes are processed in a remote terminal to form an index thereof and are utilized in retrieving the address messages and the data messages associated therewith from the tape by searching for and selecting the address message which corresponds to the location of the associated data message on the tape. The tape is generally advanced at high speed movement in the searching operation, and the speed thereof is reduced during recording and retrieval operation.

4 Claims, 7 Drawing Figures

DATA STORAGE AND RETRIEVAL SYSTEMS FOR USE WITH PLURAL TRACK STORAGE MEDIUM

This invention relates in general to certain new and useful improvements in a method of storing a plurality of audio messages or other forms of data messages on a magnetic tape and accessing these messages randomly for individual selection and presentation to a user thereof.

In accordance with this invention, there is provided a system for recording messages along one or more tracks of a multi-track tape with a succession of address codes recorded non-uniformly on an adjacent track. The system employs multiple terminals and may be combined with and be accessed by a central digital computer. Furthermore, the system can operate in either an authoring mode or editing mode on an off-line basis and a retrieval mode on an on-line basis.

This system of the present invention overcomes the disadvantages of the various prior art arrangements which include recording of pulse train address information with related clock pulses on an additional track necessitating the provision of wide-band amplifiers for both pulse trains, or the recording of the address on the same track as the message.

More particularly, in accordance with this invention, there is provided both a method and a system for recording and retrieving information from a tape medium, and in a preferred aspect the information is present in the form of audio information. Thus, there is provided a method of retrieving an audio message in a location on one track of a tape medium by searching for an address message in an absolute address location on an adjacent or another track of the tape medium, and where the method comprises searching for said address location or message during high speed movement of said tape medium until a predetermined pulse count associated with the address of interest has been achieved, then reducing the speed of movement of said tape medium to search for the absolute address location of said address message; locating the audio message from said absolute address location, and retrieving the audio message in said last-named audio information location.

In a preferred aspect of the present invention, the pulse count is generally provided by the take-up shaft of a tape transport mechanism. Furthermore, during the high speed search of the address location, the head of the tape mechanisms are retracted so that they are not in contact with the tape medium. A central processor does not monitor the address during high speed search thereby permitting multiple management of multiple tape transports on a time-shared basis.

In general terms, the method of the present invention can be described as a method for storage and retrieval of a series of related address and data information and which information includes a plurality of address messages and a plurality of data messages of information. This information is generally stored on a plural track storage medium, such as a magnetic tape or the like. The method generally comprises the recording of a plurality of these address messages on the storage medium, and where each of the messages comprises a plurality of address words on one track of the storage medium. In addition, the method includes the recording of a data message associated with each address message on another track of the storage medium. These data messages are addressably located with respect to the address messages with which they are associated.

An index number for each of the messages is generated and this index number specifies the location of the address code on the storage medium. The general index of each of the index numbers is generated to identify the messages by their respective index numbers. This general index is then stored in a terminal controller. Each of the address messages can be located and therefore, the data messages associated with the address messages can be located by accessing the general index in the terminal storage member for the index number associated with each address message.

The above method can be further characterized in that the data sector in a preferred aspect in the present invention comprises audio information. The address messages generally comprise two address words and each of the address words are comprised of eleven bits. In these eleven bit address words, the first bit represents a start bit, the next seven bits represent address information, the eighth bit represents a parity bit and the last two of the eleven bits represents stop bits. In this case it can be seen that each address message will always be of the same binary length and therefore each address message actually constitutes one address sector. The data messages may be of any length and therefore in the truest sense do not define a particular fixed length message.

Each of the address messages comprises a plurality of multi-bit address words, as aforesaid, and in each address message, one of the address words is a most significant address word, and another one of the address words is a least significant address word. The most significant bit of the most significant address word in each address message is always the same bit state. The most significant bit of each least significant address word in each address message is also always the same state. In this particular case, the most significant bit in the most significant address word in each address message is different than the most significant bit in each least significant address word in each address message. Preferably, the most significant bit in each most significant address word is a "one" bit and the most significant bit in each least significant address word is a "zero" bit.

The method of the present invention can also be described in general terms as a method of addressably recording information comprised of the aforesaid address codes and a data sector on a movable multi-track storage medium. The method in this respect includes the recording of the address codes on one track of the multi-track medium while the tape medium is moving past a recording element. A location derivation pulse is periodically generated for each fixed length segment of the tape medium, which is related to each rotation of a take-up spool on a tape transport, as the tape medium moves from an initial starting point past the recording element. These pulses are generated in synchronous time relationship to the recording of the address messages on the tape medium as the tape moves past the head.

In order to retrieve a particular address code, the number of location derivation pulses is counted and which number of location derivation pulses is generally equal to the number of pulses generated for a particular address sector, and in like manner equal to the address code which would be read off of the tape medium. The tape medium is moved for a distance from the initial starting point through the number of fixed length segments equivalent to the number of location derivation pulses generated with respect to the particular address message, to thereby retrieve the information at this address location.

In further detail, this method can be characterized in that each fixed length segment is equivalent to the length of the tape medium required to record one address message, and hence the fixed length segment is sufficient to generate one location derivation pulse. In this method, a data message is also recorded on another track of the multi-track medium and this data message is in an addressable location with respect to the address message with which it is associated. The tape medium is moved at a high rate of speed during movement to the particular address location, and at a lower rate of speed to retrieve the address message or the data message which is associated therewith. Generally, the high speed movement if the tape medium is of to this said lower speed of movement at least one address message in advance of the particular address location sought. Furthermore, monitoring of the address track on the tape medium by a terminal controller may occur during the recording of the information on the tape medium. However, no monitoring takes place during high speed movement of the tape medium to the particular address sector location for retrieval of information in this particular address sector.

The system of the present invention is also directed to the retrieval of information of duration equal to at least one address message or address sector on a movable multi-track storage medium. This system comprises at least one information handling terminal capable of recording information on this storage medium, and in this case, the information will generally be at least this one address message and the one data message associated therewith. Controller means is operatively connected to each information handling terminal. Furthermore, means are provided to enable operative connection of the controller means to a central computer or other form of data storage mechanism of the type capable of permitting storage and retrieval of information.

Pulse generating means is operatively associated with the information handling terminal to generate an index number related to each address message since the address messages are derived from the index numbers. Thus, the index member is correlated to the location of the address message on the storage medium. This storage means in the aforesaid controller is capable of storing an index number related to the index pulses and thereby forming a general index of these index numbers. Further, means are provided to permit operative connection between the information handling terminal and the controller means. The index pulses and hence the index numbers are received at a central storage member in the controller. In addition, means are also provided at the information handling terminal to permit an accessing of the controller storage means for the location derivation code related to a particular desired address message, in order to retrieve this address message on the storage medium at the information handling terminal by use of the location derivation code.

In further detail, the system of the present invention can be further characterized in that the control means is operatively interposed between the storage means and the information handling terminal. Means are also operatively located at the information handling terminal to record the audio information in the data sector.

In another aspect of the present invention, a plurality of the remote information retrieving terminals are provided for operative connection to the central computer. These remote information retrieving terminals are generally audio terminals and are connected through an audio-file controller to the computer. In this particular case, the computer is generally a form of a digital computer.

The remote information handling terminal will generally include a tape deck, and the storage medium in this case is generally a magnetic tape medium. The controller at the remote information handling terminal will also comprise a random access memory element. In like manner, means are provided at the remote information handling terminal to record the address messages on one track of the storage medium and the data messages associated therewith on another track of the storage medium. These data messages are generally recorded in such manner that they are addressably located with respect to an address message with which they are associated. In a preferred aspect of the present invention, a video display terminal, such as a cathode ray tube display, is also operatively connected to the control means and is located at the remote information handling terminal.

In another preferred aspect of the present invention, the remote information handling terminal will usually include the display means, such as a cathode ray tube display device and an author box which is generally a recording amplifier. The terminal also comprises a tape deck which is provided with an electronic revolution counter located on the take-up spindle of the tape deck and which generates pulses as the tape moves. This electronic revolution counter generally comprises the pulse generating means which enables a counting of the number of pulses generated to thereby determine the approximate location of a particular address message on the tape storage medium.

Thus, from the above, it can be seen that each address message is uniquely located on the magnetic tape medium. When the revolution counter on the shaft of the tape deck is rotated, it will generate approximately four pulses per revolution. Each pulse represents a particular binary number and this binary number is then essentially the address message which is recorded on the address track of the tape. Since each address number is comprised of two fixed length words, the address number, which constitutes an address sector, is directly related to the generation of the pulse by the revolution counter. This pulse is then used to generate a location derivation code which is then recorded in a terminal processor. Thus, if one wishes to locate a particular address on the tape, it is merely necessary to find the location derivation code which will be essentially the same binary number as the address on the tape. The location derivation code will also represent the number of pulses which have been generated in order to reach a particular address location.

The addressing scheme of the invention can be conveniently related to the pages of a book. Thus, for example, a particular chapter of a book may extend from pages 6 through 12. A general index which is established would indicate that this chapter 1 started on page 6. In like manner, the addressing scheme of the present invention will provide information that a particular data message started with a particular address code on the tape.

Having thus generally described the invention, reference will now be

Having to the accompanying drawings, in which.

Figure 1:
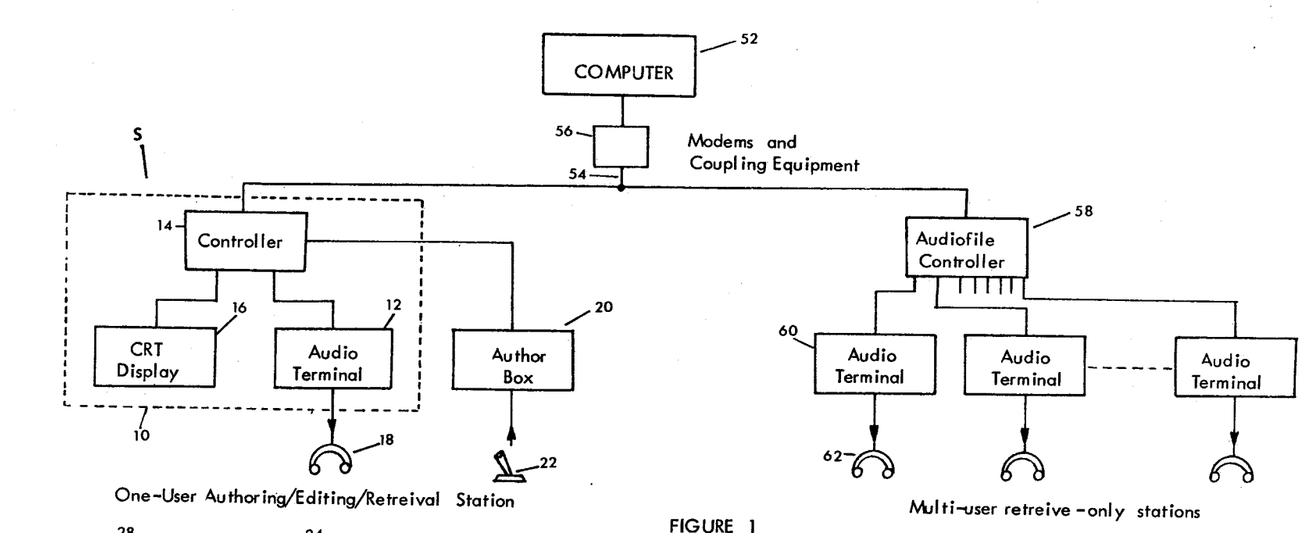
FIG. 1 is a diagrammatic view showing a system for recording and retrieving information in accordance with the present invention and operating in conjunction with conventional digital computer equipment.

Referring now in more detail and by reference characters to the drawings which illustrate practical embodiments of the present invention, S designates an information storage and retrieval system constructed in accordance with the present invention. The system S generally is operable with audio information, although it should be understood that other forms of stored information could be utilized with the system as illustrated and described herein. The system A generally includes a single terminal 10 in the form of a mechanism which is capable of authoring, editing and retrieval modes of operation. This mechanism 10 generally comprises an audio terminal 12, preferably in the form of a tape deck, tape transport or other similar mechanism for recording on magnetic tape mediums. The audio terminal 12 is connected to a controller 14 which is in turn connected to a cathode ray tube display device 16 or any other similar type of display member. The audio terminal 12 may be conveniently provided with a headphone schematically designated as 18 or similar speaker mechanism as desired in order to present the audio information retrieved from the system. Furthermore, a recording amplifier, designated as "Author Box" 20 is also operatively connected to the controller 14 in the manner as illustrated in FIG. 1. In like manner, the recording amplifier may be provided with a microphone designated as 22 or similar input mechanism.

Figure 2:
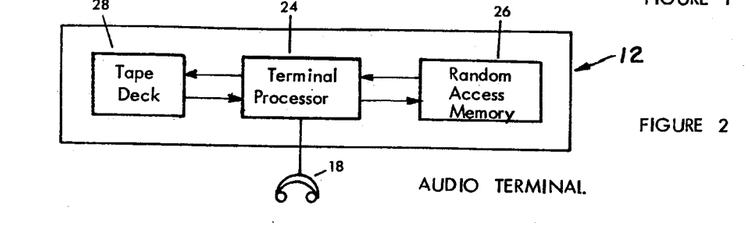
FIG. 2 is the diagrammatic view showing the audio terminal in the system of FIG. 1 in more detail.

The audio terminal 12 is more fully illustrated in FIG. 2 and generally comprises a terminal processor 24 which is capable of handling the information received from a remote computer to be hereinafter described, through the controller 14. In addition, the terminal processor is connected to a random access memory 26 in the manner as illustrated in FIG. 2, and a tape deck 28 as also illustrated in FIG. 2. It can be observed that the head phone 18 is connected to the terminal processor 24.

Figures 3, 4, 5:
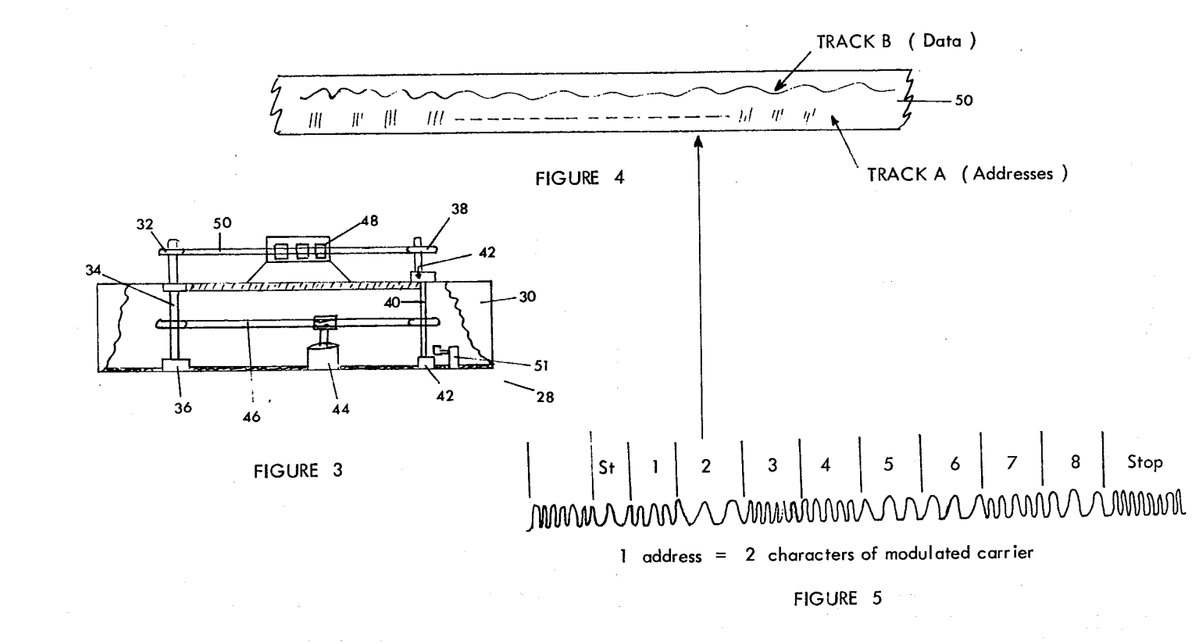
FIG. 3 is a side elevational view partially broken away and in section and showing a portion of the tape deck which forms part of the audio terminal in the system of FIG. 1.
FIG. 4 is a schematic view of a dual-track tape showing audio messages recorded on one track of the tape with address messages recorded non-uniformly along another or adjacent track of the tape.
FIG. 5 is a schematic view of two characters of address information in modulated carrier format.
Figure 6:
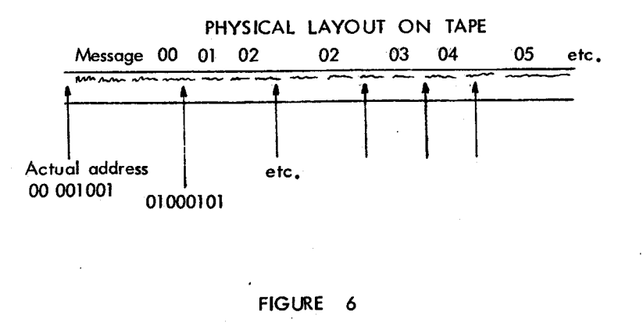
FIG. 6 is a schematic view showing the physical relationship of message information and address information in bit format on a tape medium.

The tape deck 28 is more fully illustrated in FIG. 3 of the drawings, generally in schematic form, and includes a housing 30 having a tape dispensing spool 32 removably mounted on a dispensing spool shaft 34 which is suitably journaled in bearings 36. The tape deck 28 also includes a take-up spool 38 which is removably mounted on a take-up spool shaft 40, the latter in turn being mounted within bearings 42. Either one or both of the spool shafts 34 and 40 may be driven by means of an electric motor 44 through a drive mechanism 46, in the manner as illustrated in FIG. 3. This drive mechanism 46 has been schematically illustrated as comprising a drive belt operable with a pair of pulleys mounted on the respective shafts 34 and 40. Alternatively, it should be recognized that two separate electric motors could be used to drive the spool shafts 34 and 40 individually. In like manner, synchronous electric motors may be used in some cases. The tape deck 28 will also include a head mechanism 48, which in this case, comprises a recording head, an erase head, and a reproducing head in the manner as illustrated in FIG. 3. It should also be recognized that transport circuitry of the type found in tape transporting would be included in the tape deck 28.

A tape 50, of the type which is capable of having information magnetically recorded thereon is dispensed from the spool 32 and wound upon the spool 38 in the manner as illustrated in FIG. 3. An electronic revolution counter 51 which is generally conventional in its construction is located to be operable with the take-up spool shaft 40, in the manner as illustrated in FIG. 3. This electronic revolution counter 51, which effectively serves as a pulse generator, is capable of generating location derivation pulses in response to the number of revolutions of the spool shaft 40, and along with associated generally conventional pulse generating circuitry, is also capable of generating pulse counts pursuant to this number of revolutions.

The controller 14 is connected to suitable data processing equipment such as a conventional digital computer 52, through an accessing line 54. Modems 56 or other forms of transmission equipment such as acoustic coupling equipment and the like may be interposed in the accessing line 54 so that information may be introduced into and retrieved from the computer 52 at a remote site through voice communication links or other form of communication links.

An audio file controller 58 may also be connected to the accessing line 54 and permits accessing by any of a plurality of audio terminals 60 which may be similar to the audio terminal 12. Again, the audio terminals 60 may be conveniently provided with a headphone mechanism designated as 62 or other form of data retrieval and presentation mechanism.

The system of the present invention may be constructed in a variety of system configurations and the first configuration is the single audio terminal arrangement which is capable of operating in the authoring, editing and retrieving modes. In this arrangement, the audio system is combined with the cathode ray tube terminal 16 and in the authoring and editing modes can operate on an off-line basis and on an on-line basis in the retrieving mode. A second configuration as also illustrated in FIG. 1 employs multiple retrieve only terminals connected to a single audio-file controller, such as the controller 58 which is time-shared among several of the audio terminals 60. In this case, the controller 58 would also operate in conjunction with the computer 52 over the single accessing line 54.

A typical magnetic tape 50 which may be used in accordance with the present invention is illustrated in FIG. 4 and includes an address track designated as TRACK A and a message track, designated as TRACK B. The audio messages will be recorded along TRACK B with address messages or address codes recorded non-uniformly along TRACK A. The audio or other forms of data messages and the address information are recorded using an amplitude or frequency or phase modulated signal on a carrier signal which is within the audio band. With respect to standard tape movement, an address code can be recorded approximately every tenth of a second apart. The address information is preferably recorded in the form of two characters in the manner as illustrated in FIG. 5 and these address characters are recorded in modulated carrier format.

The data which is being stored and retrieved from the message track by the system can be either an audio signal or a digitally encoded signal. The system of the present invention will accept either audio signals or digitally encoded messages as long as the tape medium employed is a conventional magnetic audio tape having at least two or more tracks of information.

Referring to FIGS. 3 and 4, it can be observed that the address message is recorded in the form of two words, each having eleven bits and preferably in the form of an ASCII character so that eight bits represent address data, one bit represents a start bit and two bits represent stop bits. This approach allows the use of the standard ASCII serial/parallel or parallel/serial modules in a read/write system. Therefore, one address message is taken as an address word pair. Thus, two eleven bit characters will constitute one address word and in this case two address words is equivalent to one address sector.

In order to avoid any ambiguity among address codes, the most significant bit of the most significant address word is always in the binary "one" state and the most significant bit of the least significant address word is always in the binary "zero" state. Thus, in reading an address message from an address track, the processor in the present invention always pairs two words together to make an address message and will recognize the order of the most significant bits of each of these words. In this way, it is possible to ensure that the least significant word of one address in not combined with the most significant word of the next address on the address TRACK A. It should be understood, that the use of an eleven bit character is not critical to the present invention and that a number of other bit codes could be employed. In like manner, any number of characters could be assigned to a word or a sector and again the invention is not limited to two character words.

The audio terminal 12 or any of the audio terminals which access the audio-file controller 58 are preferably standard recording tape transports and the electronic revolution counter 51 which is fitted to the take-up spool shaft 40 of the deck will generate pulses as the tape 50 moves on the transport. These pulses would generally be in synchronism with each address code as it is read from the tape 50.

In this respect, it should be recognized that there are essentially two methods of searching the tape for a particular address sector. The first of these methods resides in reading the actual address from the tape itself and the second is to locate the address by counting the pulses generated at the electronic revolution counter. The addresses on the tape were recorded by means of the tape deck previously described, and the pulses which essentially constitute location derivation pulses were derived from the revolution counter 51. Consequently, it can be observed that a synchronism will exist between the pulses which are generated at the revolution counter 51 and the location of the particular address on the tape. Thus for example, if five sectors of addresses were recorded on the tape, five location derivation pulses would have been generated assuming that the tape commenced at its initial starting point. In this respect, it should also be observed that the location derivation pulses will be in fairly precise synchronism with the exact location of the addresses on the tape since the location derivation pulses were generated when the addresses were recorded on the revolution counter, and this particular counter is also used in again locating the particular address.

At the time of recording audio messages onto the tape 50, a cross-reference index may be generated in the system which relates each audio message by the index number of the associated address to the actual location of the address code at its start on the tape medium. This information is then recorded on the tape later for subsequent use in the accessing process.

The tape deck 28 which is utilized in the audio terminal 12 is preferably a multi-speed tape deck of the type which is capable of operating at a high rate of speed and at a lower rate of speed to record and retrieve information. In this case, the tape deck 28 is capable of operating so as to move the tape medium 50 at a high rate of speed during selection of the particular address. Thus, the motor 44 will rotate the spindles and hence the spools 32 and 38 at a relatively high rate into a retrieval or recording position in accordance with the number of location derivation pulses required for locating a particular address sector. Thus for example, if a particular address code was recorded as the fifth address message on the tape medium, five location derivation pulses would have been generated. Hence, in retrieving this address and any data associated therewith, the tape deck will operate at this high rate of speed during the period of time until it counts five location derivation pulses. Thereafter, the speed will automatically slow down to the normal speed used in recording and retrieving information. In a preferred aspect of the invention, the tape speed slows down approximately one address sector in advance of the sector of interest.

The tape deck used in the present invention can be operable with reel to reel tapes or casette tapes and while a reel to reel tape recorder has been illustrated in the drawings and described herein, it should be recognized that the invention is not so limited. Furthermore the invention is so designed that it is not necessary to use relatively expensive digital type tape decks and that relatively inexpensive tape decks could be utilized in the present invention.

As illustrated in FIG. 1, the cathode ray tube display device 16 is operatively connected to the computer 52 through the controller 14. This computer 52 will ideally contain information such as video information which is to be displayed on the display 16 in synchronism with audio messages contained on the tape 50. Further, the information for display contained in the computer may contain graphical and/or alpha-numeric information. In this way the user of the system could obtain an audio presentation along with a video display of the information of interest on the screen of the cathode tube display device 16. Although a raster pattern monitor display device has been found to be the most effective in accordance with the present invention, it should be recognized that other forms of display devices could be used as well.

With respect to the retrieval mode of operation, a cassette may be inserted into the terminal, or otherwise reel to reel tape may be used, whether the terminal is the audio terminals 12 or any of the audio terminal 30. The index on the leader of the tape is immediately read from the tape and transferred to a random access memory at the terminal processor. When it is desired to access a particular message, the index number of the associated address will be examined by the processor at the remote terminal to establish the actual address on the tape at its start. The current tape position is then read and the difference between this current position at the time of reading and the desired address position is then automatically calculated. In this way a count is computed and if the count is negative, the tape will be driven backwards, whereas if the count is positive, the tape will be driven forward at search speed.

If the count is negative, it is made positive with a small bias added. In like manner, if the count is positive then a small bias is subtracted. The introduction of the bias will ensure that the high speed search will always terminate in a place where the tape can be advanced forwardly to the desired address. The countdown value is thereupon placed in the countdown register at the audio terminal and the tape placed in high speed motion since the direction thereof has been determined as above mentioned. The revolution counter which is fitted to the take-up spool of the deck provides output pulses to the countdown register in order to step-down the counter. Therefore, when the count-down register passes through zero it will generate a stop signal for stopping of the tape motion. The processor is then thereupon signalled of this condition, and the tape is then advanced in a slow forward motion and the address codes read from the address track to the exact location of the message start bit address and also during the audio message sector.

If the tape overshoots the desired position, the above process is re-initiated and a "negative once" signal is set by the processor. Upon re-searching for the address, if another overshoot results, the tape is again stopped and it may be assumed that the last address read is the correct address. After determining the correct address location, the playback amplifier for the audio message track is then enabled thereby delivering the audio message to the user. During playback, the address is continuously read and when the address of the next message less one address is reached, the tape movement on the transport is automatically stopped.

It can be observed that this technique for addressing messages on a tape is quite unique and highly effective in that it enables a precise and very quick location of a particular address sector and a data sector associated therewith. Generally, requests for retrieval of a message originate in the computer 52 which, in turn, generates a message index number or serial number at the beginning of the tape operation, these serial numbers are correlated to the particular address location of the message on the tape. In this way, the computer 52 can call up a data message by its address message number without requiring the precise knowledge of the location of the message on the tape.

This technique is highly effective in editing tapes in that it is now possible to alternate positions of the messages and the address sectors associated therewith without altering an entire computer program, inasmuch as a message No. 1 is still called-up by its serial or message index No. 1, wherever the message may be located on the tape. In like manner, a tape identification number may also be stored with other information located in the computer so that the identification number of a particular tape, and therefore the data messages associated therewith, are identified and correlated to the computer program.

Further, the method of addressing, previously described is unique in that the revolution counter on the shaft of the tape deck generates the derivation pulses which are essentially in synchronism with the address sectors on the tape. This fact obtains inasmuch as the address messages were derived from the very pulses generated by the revolution counter and this, in turn, allows an operation with high-speed positioning and with a high degree of accuracy, because the heads can be retracted from the tape while searching. Furthermore, the system is designed so that no ambiguity in positioning of sectors of information on the tape will arise. In other words, it is possible to obtain a particular address at a high rate of speed and to confirm it without any ambiguity. This would not occur, if only pulses were counted inasmuch as the counting of pulses could be out of step.

Figure 7:
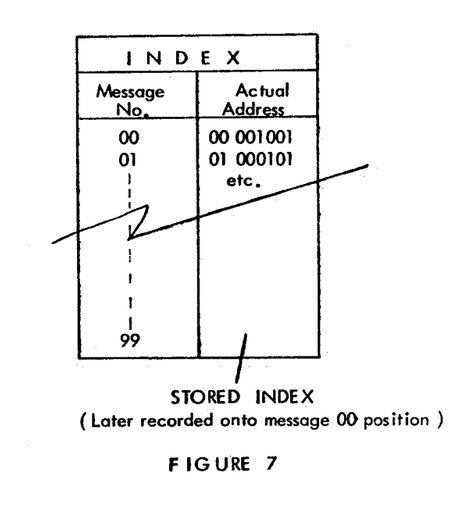
FIG. 7 is a schematic view showing in code form an index relating audio message information to the actual address information associated therewith.

In the recording mode of operation, a pre-addressed tape is inserted into the audio terminal such as the terminal 12 or the audio terminal 60. An interactive routine using the cathode ray tube may be employed in this recording mode of operation and the user introduces a tape identification number which is then stored in the terminal and later recorded on the tape leader for subsequent tape identity checking. The tape will then advance to the address location of the message number 01 in bit form after leaving sufficient blank space for later recording of the index as the message 00. At this point, the user may now control the tape transport. The user may move the tape forward or backwards on the transport under the high speed mode of operation and the transport may be operated in the playback or record modes. In this connection, it should be noted that backwards motion will be restricted to moving backwards to the beginning of the current record. Forward motion remains relatively unrestricted because the end of the message has not yet been defined. At the end of any particular message, the user will actuate an "end of message" switch at the terminal 12, at which time, the processor advances the tape two complete addresses. The processor will have used the last address as the start of the next audio message record. This address is stored in the processor memory for developing the index at the end of the recording session. It should be observed by reference to FIG. 7 that the index message will thereupon be recorded as 00 with the actual address of 00 001001. The user may proceed to record all messages in this way and at the end of any recording session he may then actuate an "end of session" key switch and wait a few moments. This time delay will cause the tape to rewind at high speed and then record the tape identification and cross-reference index onto the blank space previously reserved on the leader prior to audio message 01.

In the editing mode of operation, this mode is similar to the recording mode except that, when the tape is first inserted into the terminal, a check of the tape identification number is made to ensure that the correct cassette has in fact been introduced. Upon determination of the correct cassette, the index is read off of the tape into the terminal memory. The user may then retrieve any message using a keyboard and the cathode ray tube. When the selected message has been achieved, the user has control of the tape transport and can listen to or re-record the message within the confines of the existing audio message sector lengths. During this process, the cathode ray tube or other display device will display a count-down to the end of the message to permit the user to fit the new message into the available space. At the user's discretion, it is possible to override the next message area by actuation of an "override" key switch (not shown) on the tape transport. If the author terminates the message in less space than provided in the previous record, the tape is automatically erased to the end of the previous record. At the end of an editing session, the modified index is then re-recorded back into the tape index area as previously described.

The addressing mode of operation is designed to pre-record the addresses along the address track. This procedure is not usually performed on the user's tape transport in the multiple terminal arrangement, since this transport would normally not be equipped to erase or record the address track, but only to read the address track. Addresses are recorded serially onto the tape, with the address information being supplied by the address counter. The output of the revolution counter on the take-up spool is used to advance the address counter and initiate serial output to the tape. Thus, the number of addresses and the number of counts from the revolution counter should be the same. After recording the entire tape, it is played back to validate the presence of all codes.

It should be observed that the method used to search addresses is unique and that the addresses are recorded in the form of a succession of codes which are in general synchronism with the pulses derived from the take-up shaft on the tape transport. It should also be observed that the addresses are not read from the tape while it is moving at high speed. Rather, at a high search speed, the pulses from the take-up shafts are used to decrement a counter which has been set to a value sufficient to locate the tape in approximately the correct address location. This value takes account of the direction of search as indicated above. When the count-down register reaches 00, a slow speed search will commence for the absolute location of the tape at the desired location. During the high speed address search, the heads may be retracted to reduce head wear. Inasmuch as the processor is relieved on monitoring addresses during the high speed search phase, the processor is capable of managing multiple transports.

As indicated previously, each character includes start bits and stop bits and the system can clock these characters due to the fact that tape speed in the playback mode is stable and known. Inasmuch as high resolution is required, that is, an address message exists approximately every one-half second of movement on the tape, thus more than one character of address data is required. Nevertheless, by utilizing the two character address uniquely identified, the number of addresses required by a 30-minute tape can be readily achieved without reducing the system integrity.

The message retrieval concept is also highly unique, in that the technique of generating an index for the purposes of retrieving messages by a single message number would not otherwise be possible. Furthermore, the system of the present invention operates on an off-line basis in the authoring and editing modes of operation thereby substantially reducing the amount of computer accessing time. Authoring and editing can be performed by relatively non-skilled personnel with the cathode ray interaction, thereby eliminating the need of costly skilled personnel. It should also be observed that the use of a single controller to operate several audio terminals generates a high efficiency which would not otherwise be available.

It will be apparent to those skilled in the art, however, that many changes, modifications, variations, and other uses and applications of the present invention are possible, and all such changes, modifications, variations and other uses and applications which do not depart from the spirit and scope of the invention are deemed to be covered by the invention which is limited only by the following claims.

We claim:

1. A system for the storage and retrieval of information including at least one address message and one data message on a movable multi-track tape storage medium and which tape medium has a leader portion and a message recording portion; said system comprising:
   a. at least one information handling terminal capable of recording information on said tape storage medium and including a tape transport and a terminal processor and memory means,
   b. controller means operatively connected to each terminal processor of each information handling terminal,
   c. pulse generating means operatively associated with said tape transport of said information handling terminal to generate an index pulse and an index number therefrom for each data message recorded on the message recording portion of said storage medium, and which index number is related to the location of the address message on the storage medium,
   d. recording means operatively associated with said information handling terminal for recording each address message and data message on the message recording portion of said tape medium and thereafter recording the index number for each address message on the leader portion of said tape medium,
   e. terminal storage means forming part of each said terminal processor for introducing and storing the index numbers in said terminal storage means and forming a general index of such index numbers,
   f. means permitting operative connection between said information handling terminal and controller means to said storage means to receive the index numbers at the storage means,
   g. said information handling terminal also including reading means for reading an index number on the leader portion of the tape medium and introducing said index number into said terminal storage means as an instruction for reproducing a data message associated with a particular address message,
   h. means operatively associated with said information handling terminal to access the storage means for the index number associated with a particular desired address message from the general index and cross-referencing the index number read from the leader portion against a like index number in the general index for retrieving the address message on said tape storage medium at said information handling terminal with such index number, i. a central computer operatively connected to said controller means and each said information handling terminal being remote to said computer, and j. a video display terminal operatively connected to said controller means and being located at said information handling terminal.

2. A system for the storage and retrieval of information including at least one address message and one data message on a movable multi-track tape storage medium and which tape medium has a leader portion and a message recording portion; said system comprising:

a. at least one information handling terminal capable of recording information on said tape storage medium, b. controller means operatively connected to each information handling terminal, c. pulse generating means operatively associated with said information handling terminal to generate an index pulse and an index number therefrom for each data message recorded on the message recording portion of said storage medium, and which index number is related to the location of the address message on the storage medium, d. recording means operatively associated with said information handling terminal for recording each address message and data message on the message recording portion of said tape medium and thereafter recording the index number for each address message on the leader portion of said tape medium, e. terminal storage means for introducing and storing the index numbers in said terminal storage means and forming a general index of such index numbers, f. means permitting operative connection between said information handling terminal and controller means to said storage means to receive the index numbers at the storage means, g. said information handling terminal also including reading means for reading an index number on the leader portion of the tape medium and introducing said index number into said terminal storage means as an instruction for reproducing a data message associated with a particular address message, h. means operatively associated with said information handling terminal to access the storage means for the index number associated with a particular desired address message from the general index and cross-referencing the index number read from the leader portion against a like index number in the general index for retrieving the address message and associated data message on said tape storage medium at said information handling terminal with such index number, and i. video display means operatively associated with said information handling terminal to display the data messages and/or address messages associated therewith.

3. The system for the storage and retrieval of information of claim 2 further characterized in that said controller means is operatively connected to a central computer and said information handling terminal is remote to said computer.

4. A method for storage and retrieval of information including a plurality of address messages and a plurality of data messages on a plural track storage medium, said method comprising:

a. recording a plurality of address messages, each one of said address messages comprising a plurality of multi-bit address words on one track of the storage medium, b. one of the address words in each address message being a most significant address word and another one of the address words being a least significant address word, the most significant bit of each most significant address word in each address word always being the same bit, and the most significant bit of each least significant address word in each address message also being the same bit, c. recording a data message associated with each address message on another track of the storage medium and which data messages are addressably located with respect to the address messages with which they are associated, d. generating an index number for each of the address messages which is related to the location of the address and data messages on the storage medium, e. generating a general index of each of the index numbers to identify the address messages from their respective index numbers, f. storing such general index in a processing terminal number, g. locating each address message and the data message associated therewith by accessing the general index in the processing terminal for the index number associated with such address message, h. and both audially and visually presenting the data messages.

* * * * *